US012775876B2

(12) United States Patent
Yalamanchi et al.

(10) Patent No.: US 12,775,876 B2
(45) Date of Patent: Oct. 27, 2026

(54) MACHINE-LEARNING BASED ARTIFICIAL INTELLIGENCE CAPABILITY

(71) Applicant: Oracle International Corporation, Redwood Shores, CA (US)

(72) Inventors: Uday Bhaskar Yalamanchi, Union City, CA (US); FNU Akshat, Seattle, WA (US); Prashanth Ramanathan, Bellevue, WA (US); Abhiram Jagarlapudi, Seattle, WA (US); Ye Zhang, Redmond, WA (US); Aditya Banerjee, Danville, CA (US); Varaprasad Ballingam, Houston, TX (US); Athinder Patlola, Seattle, WA (US); Beiwen Guo, Seattle, WA (US); Varun Ketanbhai Shah, Mill Creek, WA (US); Safia Rahmat, Everett, WA (US); Shreyas Vinayakumar, Santa Clara, CA (US); Jigar Mody, Cedar Park, TX (US); Elad Ziklik, Bellevue, WA (US); Senthilkumar Ponnappan, Redmond, WA (US); Pranav Varia, Bothell, WA (US); Denesh Krishnan Rajaram, Bellevue, WA (US); Hariharan Balasubramanian, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 713 days.

(21) Appl. No.: 18/203,568

(22) Filed: May 30, 2023

(65) Prior Publication Data

US 2024/0403693 A1 Dec. 5, 2024

(51) Int. Cl.
*G06N 20/00* (2019.01)
*G06F 9/50* (2006.01)

(52) U.S. Cl.
CPC .......... *G06N 20/00* (2019.01); *G06F 9/5027* (2013.01); *G06F 9/5077* (2013.01)

(58) Field of Classification Search
CPC ...... G06N 20/20; G06N 20/00; G06F 9/5027; G06F 9/5077
See application file for complete search history.

(56) References Cited

U.S. PATENT DOCUMENTS

| | | | | |
|---|---|---|---|---|
| 2021/0004696 | A1* | 1/2021 | Lin | G06F 21/602 |
| 2022/0207444 | A1* | 6/2022 | Bramble | G06N 3/0464 |
| 2024/0095077 | A1* | 3/2024 | Singh | G06F 9/5027 |

OTHER PUBLICATIONS

Tanwani et al., "RILaaS: Rollot Inf ere nee and Learning as a Service", IEEE Robotics and Automation Letters, vol. 5, No. 3, May 28, 2020, 8 pages.

(Continued)

*Primary Examiner* — Grace Park
(74) *Attorney, Agent, or Firm* — Hickman Becker Bingham Ledesma LLP

(57) ABSTRACT

Techniques for providing machine-learned (ML)-based artificial intelligence (AI) capabilities are described. In one technique, multiple AI capabilities are stored in a cloud environment. While the AI capabilities are stored, a request for a particular AI capability is received from a computing device of a user. Also, in response to receiving training data based on input from the user, the training data is stored in a tenancy, associated with the user, in the cloud environment. In response to receiving the request, the particular AI capability is accessed, a ML model is trained based on the particular AI capability and the training data to produce a trained ML model, and an endpoint, in the cloud environment, is generated that is associated with the trained ML model. The endpoint is provided to the tenancy associated with the user.

20 Claims, 9 Drawing Sheets

(56) References Cited

OTHER PUBLICATIONS

Li et al., “The Design and Implementation of a Scalable DL Benchmarking Platform”, arxiv.org, Cornell University Library, Nov. 19, 2019, 15 pages.
Ferreira et al., “Web Platform for Medical Deep Learning Services”, 2021 IEEE International Conference on Bioinformatics and Biomedicine, Dec. 9, 2021, 6 pages.
Wei et al.—“Finetuned Language Models Are Zero-Shot Learners,” arXiv:2109.01652; publisher: arXiv/Cornell University; Sep. 3, 2021. https://arxiv.org/abs/2109.01652 (46 pages).
Thornton et al.—“Auto-WEKA: Combined Selection and Hyperparameter Optimization of Classification Algorithms,” arXiv:1208.3719 publisher: arXiv/Cornell University; date: Aug. 18, 2012 https://arxiv.org/abs/1208.3719 (9 pages),.
Oracle Corporation—“Data Science,” Oracle Cloud Infrastructure Release Notes; relevant sections: BYOC for jobs May 26, 2022 online Oracle Cloud Infrastructure Documentation. https://docs.oracle.com/en-US/iaas/releasenotes/services/data-science/ (37 pages).
Olson et al.—“Evaluation of a Tree-based Pipeline Optimization Tool for Automating Data Science,” arXiv:1603.06212; publisher: arXiv/Cornell University; relevant pp. 1-8; date: Mar. 20, 2016; place: online. https://arxiv.org/abs/1603.06212 (8 pages).
Microsoft “What is automated machine learning (AutoML)?,” Azure Machine Learning Documentation May 18, 2026; place: online Microsoft Learn. https://learn.microsoft.com/en-us/azure/machine-learning/concept-automated-ml?view=azureml-api-2 (9 pages).
Google Cloud “Overview of Vertex AI,” Google Cloud Documentation accessed May 18, 2026; place: online Google Cloud Documentation. https://cloud.google.com/vertex-ai/docs/start/introduction-unified-platform (6 pages).
Gijsbers et al.—“An Open Source AutoML Benchmark,” arXiv:1907.00909; publisher: arXiv/Cornell University; relevant pages: entire e-print; date: Jul. 1, 2019; place: online. https://arxiv.org/abs/1907.00909 (8 pages).
George et al.—A Scalable and Cloud-Native Hyperparameter Tuning System,: arXiv: 2006.02085; publisher: arXiv/Cornell University; Jun. 3, 2020 https://arxiv.org/abs/2006.02085 (10 pages).
Das et al. “Amazon SageMaker Autopilot: a white box AutoML solution at scale”. arXiv/Cornell University Dec. 15, 2020 https://arxiv.org/abs/2012.08483 (13 pages).
Amazon Web Services “SageMaker JumpStart pretrained models”. Amazon SageMaker AI Developer Guide May 18, 2026; place: online AWS Documentation. https://docs.aws.amazon.com/sagemaker/latest/dg/studio-jumpstart.html (10 pages).

* cited by examiner

MACHINE-LEARNING BASED ARTIFICIAL INTELLIGENCE CAPABILITY

TECHNICAL FIELD

The present disclosure generally pertains to artificial intelligence (AI) and, more particularly, to providing a reusable AI solution to multiple end users.

BACKGROUND

Artificial intelligence has assisted many users and enterprises in providing solutions for everyday tasks. Building an AI-based solution as a fully managed service, however, has been known to require many months (usually over a year) for a 15+-person team to deliver the AI-based service. Only after that point, end users of the AI-based service provide feedback indicating the value that solution provides. And this is in the context of AI being a fast moving field with over three hundred thousand papers published yearly. Thus, current techniques for building AI-based services are not only time-consuming, but also expensive.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method are described for providing AI capabilities as a "no code" service. In one technique, a user visits a cloud provider that provides AI capabilities, which are base models that can be re-trained or frameworks that are executed for training a new model from scratch. A user, via a user interface provided by the cloud provider, selects from among multiple AI capabilities. User selection of an AI capability, the uploading of training data to the user's tenancy, and user input of one or more values of parameters specific to the AI capability are sufficient to automatically train one or more ML models, automatically select an ML model, and automatically deploy the ML model, all without requiring the user to write code or manually create a training job or deployment job.

Prior to embodiments, users would have to interact with a data science component (or "tenancy") of a cloud provider in order to create a script for a training environment and a deployment environment, and to create training jobs. Embodiments improve computer-related technology by providing, to users, AI capabilities that hide the complexity of having to interact with a data science tenancy. Thus, the number of human errors in developing and deploying a machine-learned (ML) model, the time to develop and deploy the ML model, and cost of that development and deployment are all significantly reduced.

System Overview

Figure 1:
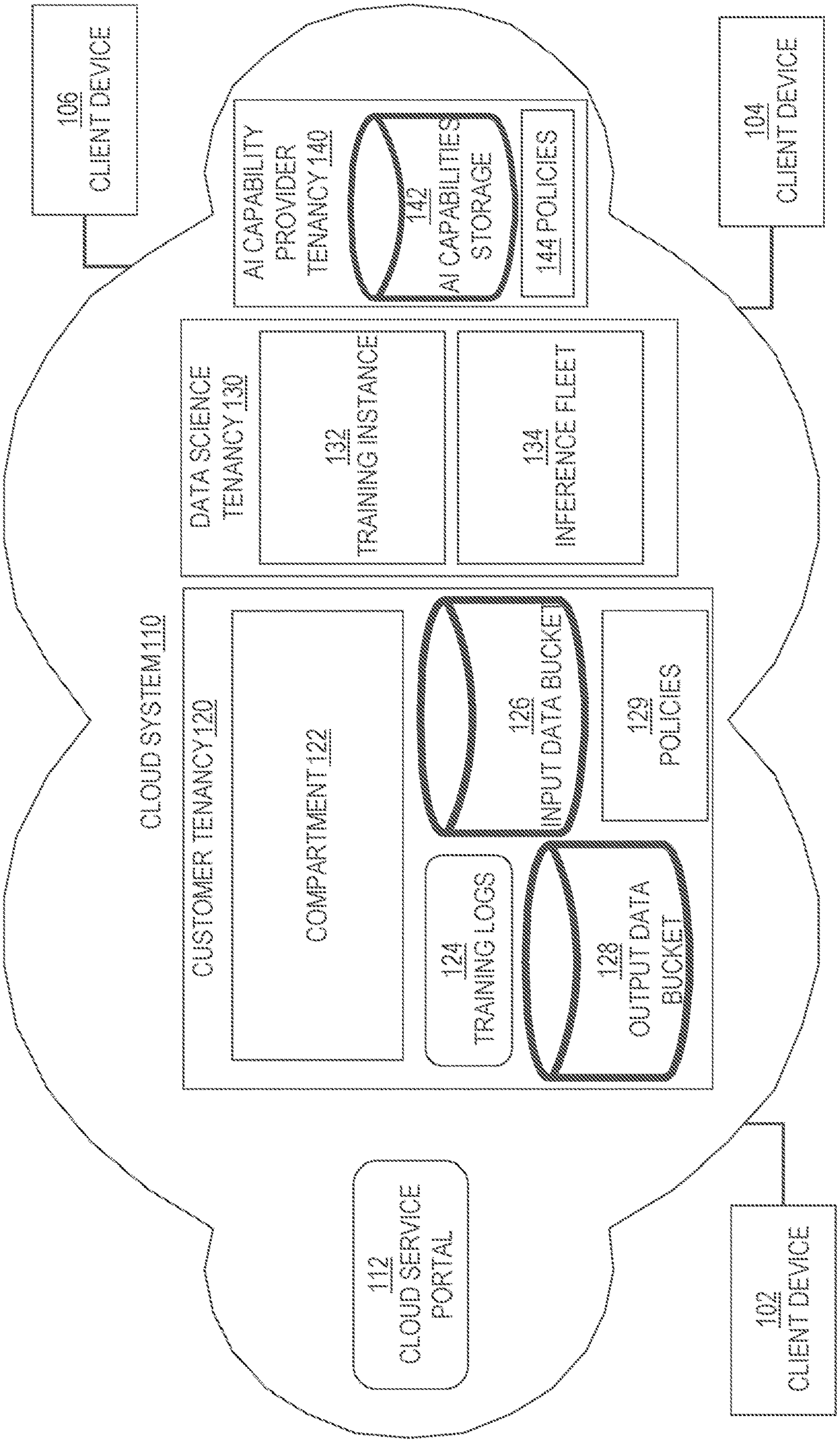
FIG. 1 is a block diagram that depicts an example cloud system that provides AI capabilities to cloud users, in an embodiment.

FIG. 1 is a block diagram that depicts an example cloud system 110 that provides AI capabilities to cloud users, in an embodiment. Multiple client devices 102-106 of users of cloud system 100 are communicatively coupled to cloud system 110 via one or more computer networks (not depicted), such as a LAN, a WAN, and/or the Internet. Examples of client devices 102-106 include desktop computers, laptop computers, tablet computers, smartphones, and wearable devices. Although three client devices are depicted, many client devices may be communicatively coupled to cloud system 110.

A cloud provider provides cloud system 110, which comprises a tenancy for each user or organization of cloud system 110. Thus, although a single customer tenancy 120 is depicted, cloud system 110 may support many customer tenancies, one for each customer. Each customer tenancy 120 is a set of cloud resources (including data) that are made available to a customer and that the customer owns (at least temporarily) and manages. The data that the customer provides to cloud system 110 is owned by the customer, not the cloud provider. Examples of cloud resources include one or more virtual machines, network resources (e.g., a VPN), compute nodes for running applications, and database nodes for storing data. A customer may be an individual user or an organization.

A single customer tenancy may include one or more compartments (such as compartment 122). For example, a customer tenancy may include a "root" compartment and one or more sub-compartments of the root compartment. A compartment is a specific portion of a customer tenancy that includes a set of data (e.g., a particular database, ML models, access policies) that is not part of any other compartment. Different compartments may be associated with different groups of an organization and/or different individuals. For example, if a customer is an organization, then one compartment may be accessible to the finance team of the organization and another compartment may be accessible to the marketing team of the organization. Thus, different compartments may be associated with different access policies and/or authorized users.

In the depicted example, customer tenancy 120 includes customer compartment 122. A user operates a client device (e.g., client device 102) and directs the client device to access a cloud service portal 112 of cloud system 110. Such directing and accessing may be through an application (referred to herein as a "management application") executing on the client device. The management application may be a native application that is installed on the client device. Alternatively, the management application may be a web application, provided by cloud system 110, that executes within a web browser that is installed on the client device. The web application accepts credentials from the user (e.g., a username and password) and cloud service portal 112 provides access to a customer tenancy (or a specific compartment with that tenancy) that the user is authorized to access. The granting of access to one or more compartments depends on policies 129, which may define what an authorized user may access in the root or main compartment of a customer tenancy and what an authorized user may access in each compartment within a customer tenancy. The management application allows the authorized user to view and manage resources in the tenancy/compartment, to select one or more AI capabilities, and to initiate the training and deployment of one or more ML models based on policies 129 associated with the user and tenancy/compartment.

Thus, a user's journey is selecting training data and then receiving an endpoint of a trained model to deploy. The user is no longer required to create an ML job to perform the model training or model deployment.

Cloud system 110 also includes a data science tenancy 130, where one or more cloud resources are provided and managed by one or more other users, such as administrators of cloud system 110. For example, data science tenancy 130 includes training and deployment resources for training machine-learned (ML) models and deploying the trained ML models, which are described in more detail herein. Data science tenancy 130 may be a native cloud infrastructure service. Data science tenancy 130 ingests training data, trains a model based on the training data, stores the model in a model catalogue, and uses the stored model at inference time.

AI Capabilities

Cloud system 110 also includes AI capability provider tenancy 140, which includes resources that were generated and provided by an entity that is different than a customer and, optionally, different than the provider of data science tenancy 130. AI capability provider tenancy 140 includes an AI capabilities storage 142 and policies 144. AI capabilities storage 142 stores one or more AI capabilities, each of which may comprise a container image and which is selectable by a user. A container image is an unchangeable, static file that includes executable code that enables the container image to run an isolated process on IT infrastructure. The image comprises system libraries, system tools, and other platforms settings a software program requires to run on a containerization platform, such as Docker.

Figure 2:
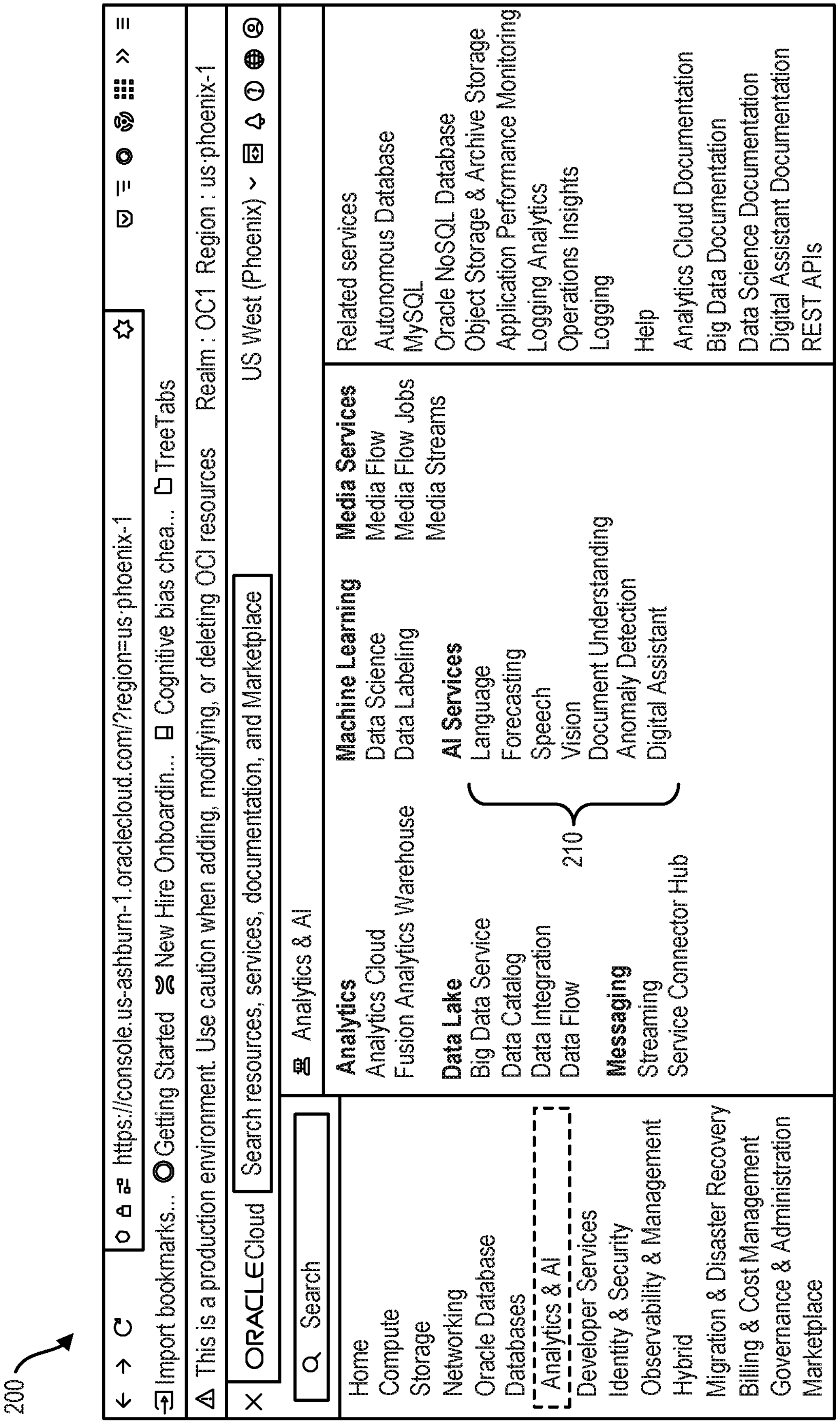
FIG. 2 is a screenshot of an example user interface provided by a management application, in an embodiment.

FIG. 2 is a screenshot of an example user interface 200 provided by a management application, in an embodiment. User interface 200 includes references 210 to AI capabilities that a user can select. An AI capability is a reusable single-tenant AI offering that solves a specific problem. An AI capability covers a broad spectrum of AI offerings (pertaining to a particular problem domain) that lie between one-off solutions (i.e., tailored for a single customer) and a fully managed service (i.e., that is generic enough for multiple customers). References 210 to AI capabilities include references to AI capabilities configured for language, forecasting, speech, vision, document understanding, anomaly detection, and digital assistant.

An AI capability may be a pre-trained ML model or a framework for training a new model. For either scenario, a user provides (e.g., uploads) training data through the management application. In the scenario where an AI capability is a pre-trained ML model, data science tenancy 130 fine tunes the pre-trained ML model based on the training data to produce a fine-tuned ML model. Fine-tuning involves using the training data to retrain/fine-tune the model, using the training data to train some layers of a neural network (i.e., where other layers are locked), and/or training a (e.g., classification) head for the pre-trained model. In the scenario where an AI capability is a framework, the framework includes the code for creating a model, modifying the model, incorporating user feedback, performing interactive machine learning, and using ML techniques to further optimize this process.

In an embodiment, data science tenancy 130 provides, to the management application, visibility regarding AI capabilities. In this way, data science tenancy 130 hides the details of where the AI capabilities are stored in addition to performing all training and deployment of resulting ML models.

AI capability provider tenancy 140 also includes policies 144, which indicate which entities (i.e., users/organizations/customer tenancies) are allowed to access an AI capability (e.g., a container image) in AI capabilities storage 142. Thus, one policy in policies 144 may identify (a) one set of entities that is allowed to access a first AI capability in AI capabilities storage 142 and (b) a different set of entities that is allowed to access a second AI capability in AI capabilities storage 142. Additionally or alternatively, policies 144 may identify certain entities that are not allowed to access certain AI capabilities.

In an embodiment, different AI capabilities are associated with different questions that define expected input from users that select the AI capabilities. Also, different AI capabilities have different pre-existing rules. For example, for an AI capability related to anomaly detection, there may be a question about a threshold or sensitivity, a request for input regarding a target false alarm probability, and a request for input regarding a training fraction ratio. Regarding forecasting as a type of AI capability, the management application may request three types of files: (1) a primary time series file regarding, for example, sales; (2) an influencing data file (e.g., weather, promotion cycles); and (3) a meta information file (e.g., size/color of clothing, brand of clothing, door displays). Regarding vision as a type of AI capability, a question may be whether the AI capability will be used for object detection, face recognition, document recognition, and/or detection in images vs. video.

In an embodiment, cloud system 110 presents different sets of questions to a user at different times, such as installation time and later during usage of the management application. Installation time is a period of time when a customer tenancy is being established. Example questions at installation time include questions regarding where a user has a network, where the user's tenancy is located, and where to deploy one or more ML models that are trained for the user. Example questions at a later time include where training data is located and what the parameters are to tune, which are specific to the selected AI capability.

In addition to AI capabilities storage 142 and policies 144, AI capability provider tenancy 140 may also include metrics about the AI capabilities in AI capabilities storage 142. For example, the metrics may indicate, for each AI capability in AI capabilities storage 142: (a) a number of customers that have checked out or otherwise utilized the AI capability; (b) a number of customers that currently have deployed an ML model that is based on the AI capability; (c) a number of successful trainings (across multiple customers) of ML models based on the AI capability; (d) a percentage of customers that are currently using an ML model that is based on the AI capability after having deployed the ML model over one month ago; and (e) an aggregated error rate associated with the AI capability.

When a user/customer selects and runs an AI capability, the infrastructure to run that AI capability comes from cloud system 110 (e.g., data science tenancy 130) through the installation process. In response to a user/customer selecting an "install" button or option in the management application, an install script is run and creates, through a development tool, resources in customer tenancy 120, such as data science jobs, data science APIs, etc. Such resources are deployed through the development tool. Terraform is an example infrastructure-as-code tool that allows users to build, change, and version both cloud and on-premise resources safely and efficiently. Other examples of the development tool include Pulumi, Cloud Development Kit, Cloud Foundry, and Ansible.

Thus, the management application is the component with which the user/customer interacts to select and install an AI capability, specify location data that indicates where training data is stored, and initiate the running of a resulting ML model. The user of the management application no longer needs to write code to train, test, or experiment.

In an embodiment, an AI capability includes code for performing automated hyperparameter tuning. In this way, a user/customer is not required to know how to code for hyperparameter tuning. In a related embodiment, an AI capability includes code for training multiple ML models based on different hyperparameters, validating/testing each of the multiple ML models, and selecting the ML model that performs the best according to one or more criteria, such as accuracy, precision, inference time, and/or training time.

Figure 3:
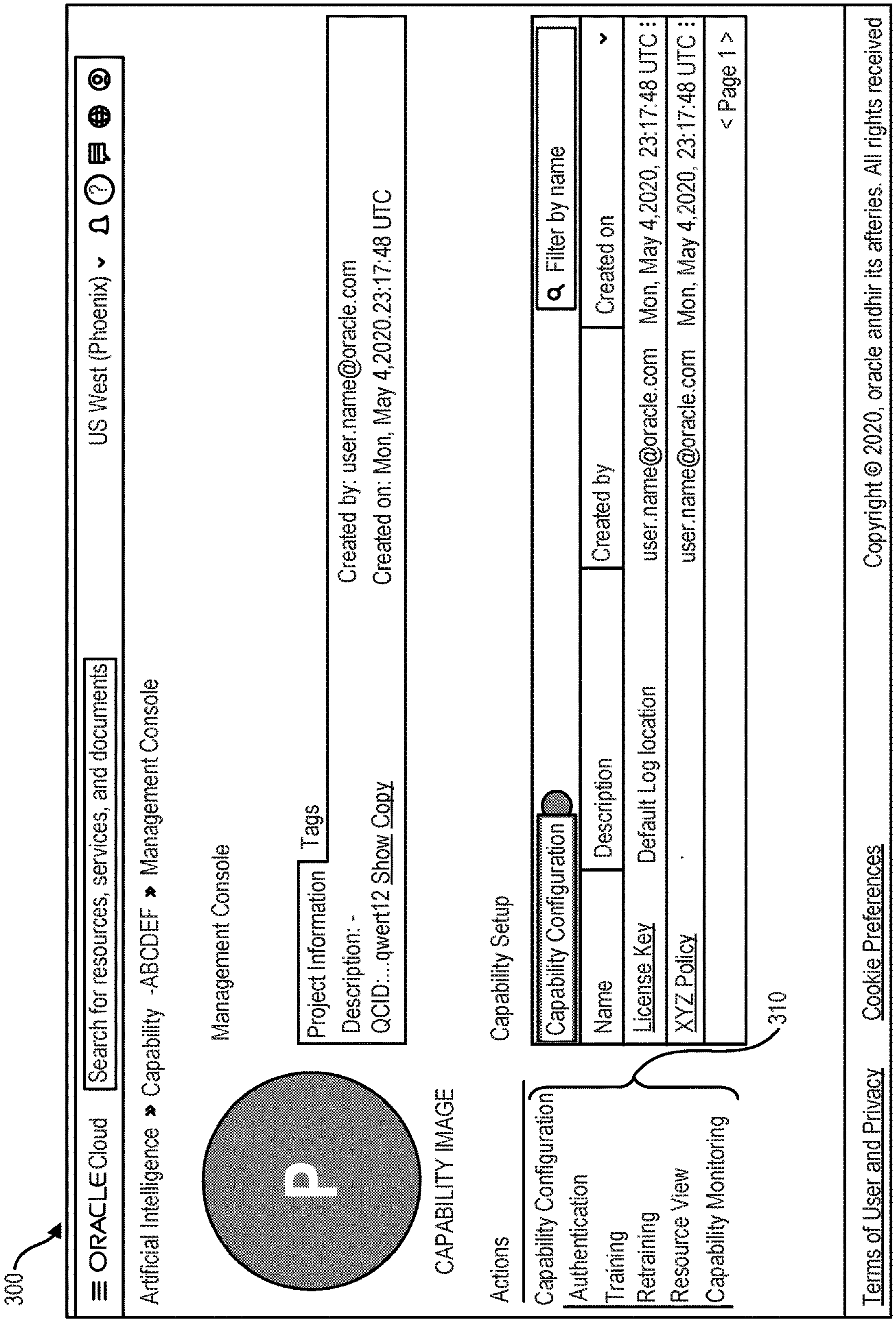
FIG. 3 is a screenshot of an example user interface provided by a management application, depicting attributes of an AI capability, in an embodiment.

FIG. 3 is a screenshot of an example user interface 300 provided by a management application, depicting attributes of an AI capability, in an embodiment. User interface (UI) 300 includes a name ("ABCDEF") of a user-selected AI capability. UI 300 also includes references 310 to actions (that are user-initiated) with respect to the user-selected AI capability. Example actions include configuring the AI capability (e.g., specifying compute, network, and I/O requirements; selecting and isolating resources) (e.g., performed by an admin of cloud system 110 or a provider of AI capabilities), authenticating users seeking access to the AI capability (e.g., performed by an admin of cloud system 110 or a provider of AI capabilities), training a model using the AI capability, retraining a base model of the AI capability, viewing resources of the AI capability, and monitoring the AI capability. Customer monitoring of an AI capability may include monitoring logs and retrieving metrics (e.g., call volume, time taken to train/inference, model accuracy, loss function).

Figure 4:
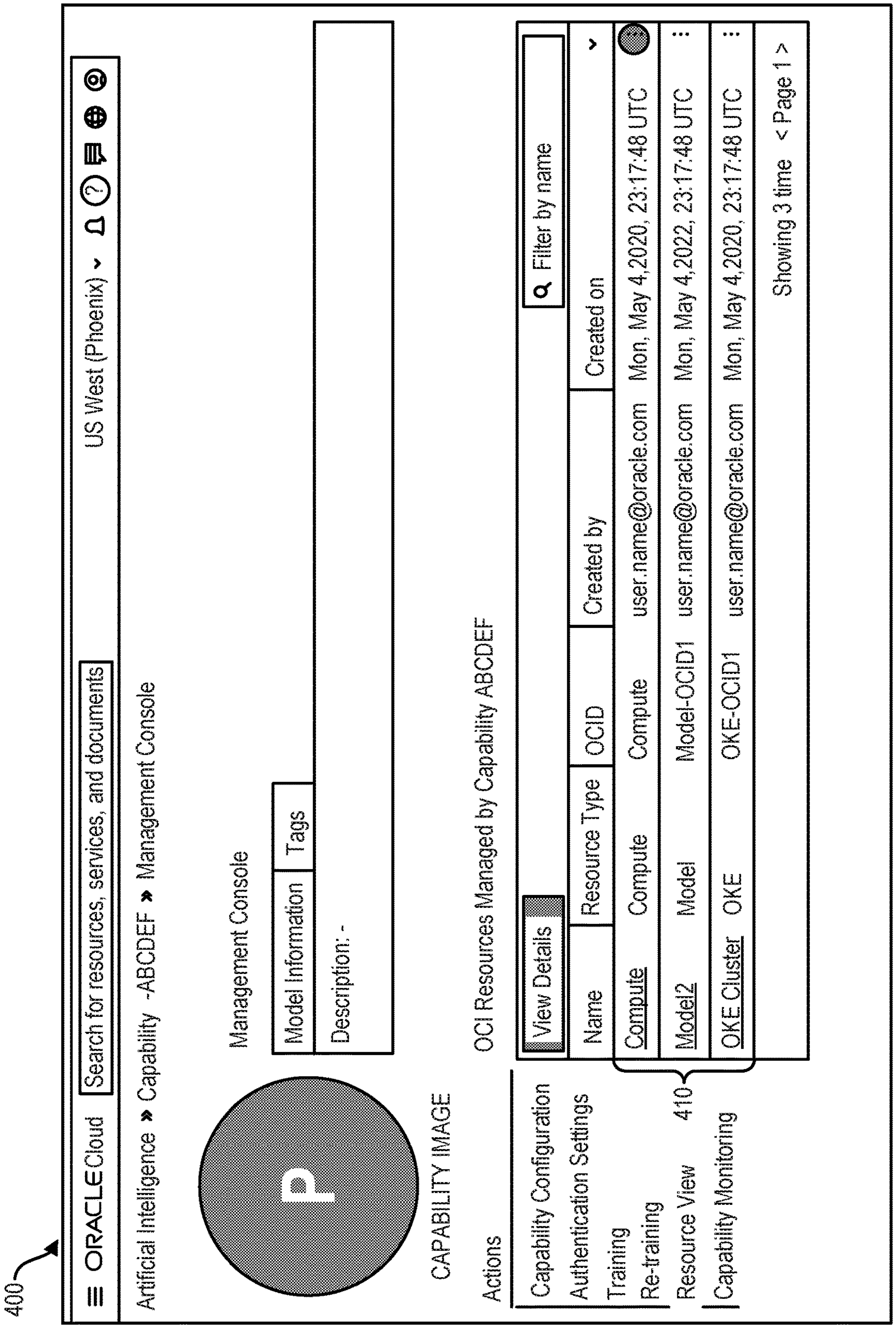
FIG. 4 is a screenshot of an example user interface provided by a management application, depicting references to resources of a selected AI capability, in an embodiment.

FIG. 4 is a screenshot of an example user interface 400 provided by a management application, depicting references 410 to resources of a selected AI capability, in an embodiment. In this example, data about the same AI capability as in FIG. 3 is displayed. The "resource view" action was selected from the actions listed in FIG. 3. Three types of resources are listed: a compute resource, a model resource, and a cluster resource. The model resource is a base model that was trained based on the selected AI capability. The compute resource is for training the model, while the cluster resource is for keeping the AI capability active.

Data Science Tenancy

An example of a training resource in data science tenancy 130 is training instance 132 that is responsible for training a ML model based on training data provided by a user. Data science tenancy 130 may automatically bring up or generate training instance 132 in response to receiving an indication of a user-selected AI capability and receiving corresponding training data. Data science tenancy 130 may automatically delete (or "take down") training instance 132 once training instance 132 completes a training process.

An example of a deployment resource that data science tenancy 130 includes is a resource that automatically generates an endpoint for a trained ML model and associates that endpoint with the customer tenancy that initiated the training of the ML model. An example of an endpoint is a uniform resource locator (URL). Like training instance 132, inference fleet 134 (which calls or invokes a trained ML model) also executes in data science tenancy 130. Inference fleet 134 comprises multiple compute machines that work together to handle individual machine failures and transfer load.

Customer Tenancy Components

Customer tenancy 120 includes multiple components, including training logs 124, input data bucket 126, output data bucket 128, and policies 129. Each of these components is therefore and is, therefore, accessible to a user of customer tenancy 120. Training logs 124 comprises data that describes the progress and/or status of one or more model trainings. Training instance 132 (in data science tenancy 130) may generate the data that is ultimately stored in training logs 124. Thereafter, a user of customer tenancy 120 may view training logs 124 in order to determine the status of training a ML model based on an AI capability that the user selected. Example training statuses may include "pre-training stage," "training commenced," "training in progress," "training failed," and "training complete."

Input data bucket 126 stores training data that training instance 132 uses to train one or more ML models. The training data comprises multiple training instances, each training instance comprising multiple values (each corresponding to a different feature of a model) and a label, such as a class value, an integer, or a floating point value.

Output data bucket 128 stores statistics that are generated during model inference. Examples of statistics include when a particular model is invoked, who caused or initiated the invocation (e.g., a client device that is remote relative to cloud system 110), whether any errors resulted from invoking the particular model, a time lapse from model invocation to model output for each model invocation, and statistics on model output distribution (e.g., a percentage of model outputs in one output category vs. another output category; a histogram of real-valued outputs). If a customer is associated with multiple active ML models, then output data bucket 128 may store statistics for multiple ML models. Thus, each statistic would include model identification data that identifies the ML model with which the statistic is associated. In a related embodiment, each compartment within customer tenancy 120 is associated with a different output data bucket that stores statistics pertaining to ML models that are associated with that compartment.

The statistics in output data bucket 128 may be used for diagnostic purposes or for measuring model performance. For example, if the number of errors is greater than a certain threshold number or a certain threshold percentage of model invocations, then re-training may be automatically triggered and/or a user is automatically notified, such as through email, text, or software application channels.

Policies 129 define access policies, specifically, who can access which data. For example, a policy may indicate that a particular user (or any user) associated with customer tenancy 120 is able to access data science tenancy 130 and AI capability provider tenancy 140. Thus, policies 129 might allow a customer to initiate one or more operations, such as checking out/leveraging an AI capability from AI capability provider tenancy 140, running a job in data science tenancy 130, and deploying a trained ML model. At least some of policies 129 may be auto-generated so that a user of cloud system 110 is not required to learn how to configure the relevant policies. Even with auto-generated policies, policies 129 may include customer-specified policies that may add restrictions or remove restrictions regarding who can access certain data and/or initiate certain operations.

In an embodiment, customer tenancy 120 includes a virtual cloud network that provides network isolation. Within customer tenancy 120, a user can create a virtual cloud network (VCN) for an organization or group of users. A VCN is useful in the security context. For example, a highly restricted customer (e.g., a bank or the Department of Defense) wishes to use one or more AI capabilities. The customer may create a VCN that will separate them from the entire Internet in a secure state and limit the users who can access and make changes to the leveraged AI capabilities by blocking network access altogether.

Through AI capabilities, different cloud infrastructure resources are owned and managed directly by the user/customer, such as the management application (which lives in a virtual machine), training log 124, one or more object stores, a VPN, etc. In contrast, training, deployment, and inference is a life cycle that is owned and managed by data science tenancy 130. The user/customer is not required to know how or when to bring up cloud resources related to that life cycle, nor when to shut them down. Before embodiments, users/customers would have to be intimately familiar with this life cycle, including writing the code for each AI capability.

Model Status

Figure 5:
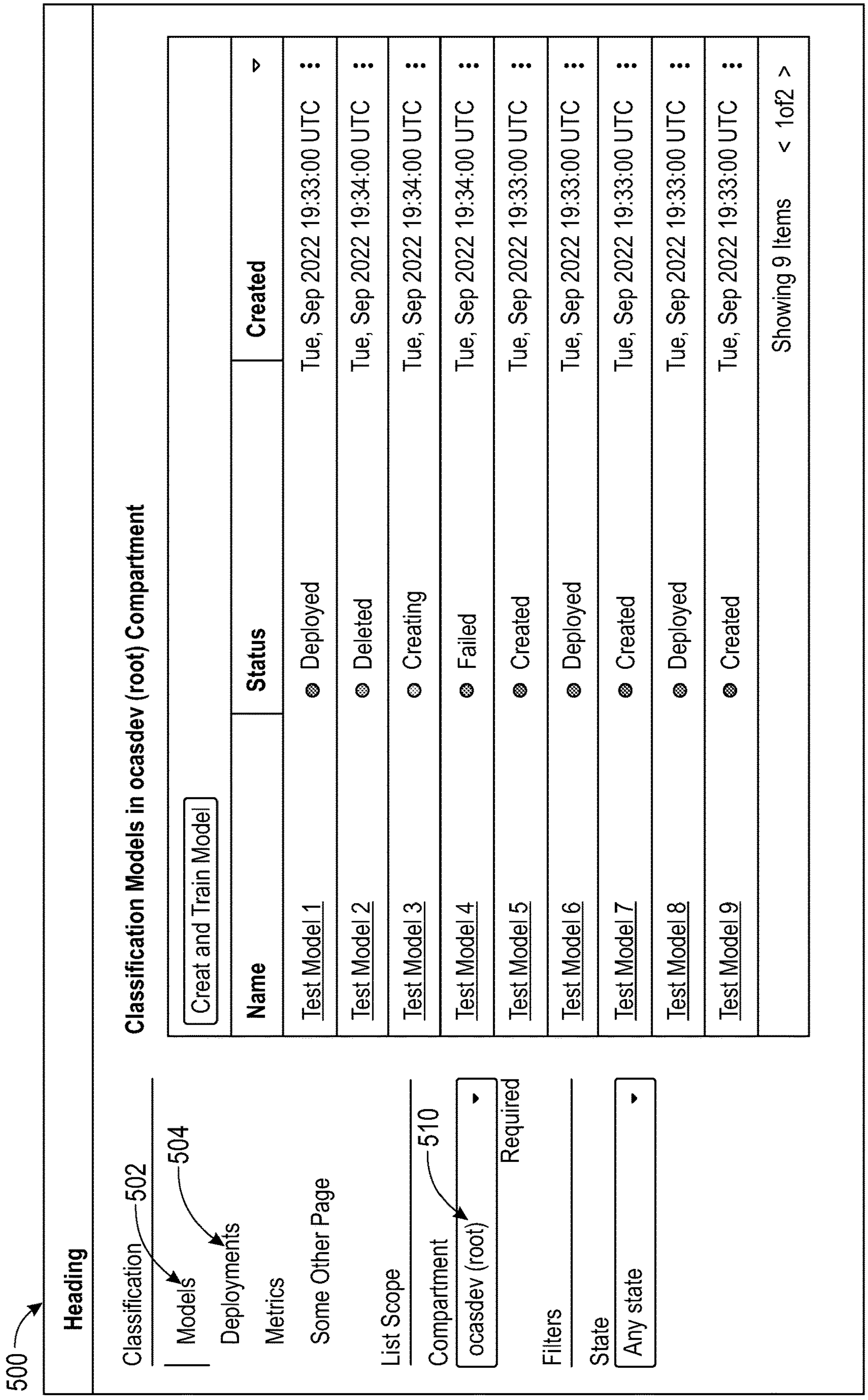
FIG. 5 is a screenshot of an example user interface provided by a management application, depicting a status of models, in an embodiment.

FIG. 5 is a screenshot of an example user interface 500 provided by a management application, depicting a status of models, in an embodiment. UI 500 includes a table that identifies nine models, a status for each model, and a timestamp of the creation of each model. The statuses include deployed, deleted (implying that the model was created/trained at some point), creating (implying that the model is currently being trained or validated), and failed (implying that the model produced incorrect output). Data science tenancy 130 may automatically deactivate a failed model. Additionally or alternatively, a user (by providing input through the management application) may deactivate a failed model and/or a deployed model. Also, a user operating the management application may "undelete" a deleted model and re-activate the model. Such user input may be received through UI 500 by the user selecting one of the listed models.

In the example of FIG. 5, the nine models are associated with a particular compartment (e.g., a root compartment) within a customer tenancy (e.g., customer tenancy 120) that may include multiple compartments. In order to view models that are associated with a different compartment, the user (presumably authorized) selects a drop down menu 510 that, when selected, causes a list of compartments to be displayed. User selection of one of those compartments will cause UI 500 to be updated to list models that are associated with the selected compartment.

UI 500 also includes view options 502 and 504. View option 502 may be a default view option, which is to view all models associated with a compartment, regardless of whether a model has been deployed or is deployed.

Figure 6:
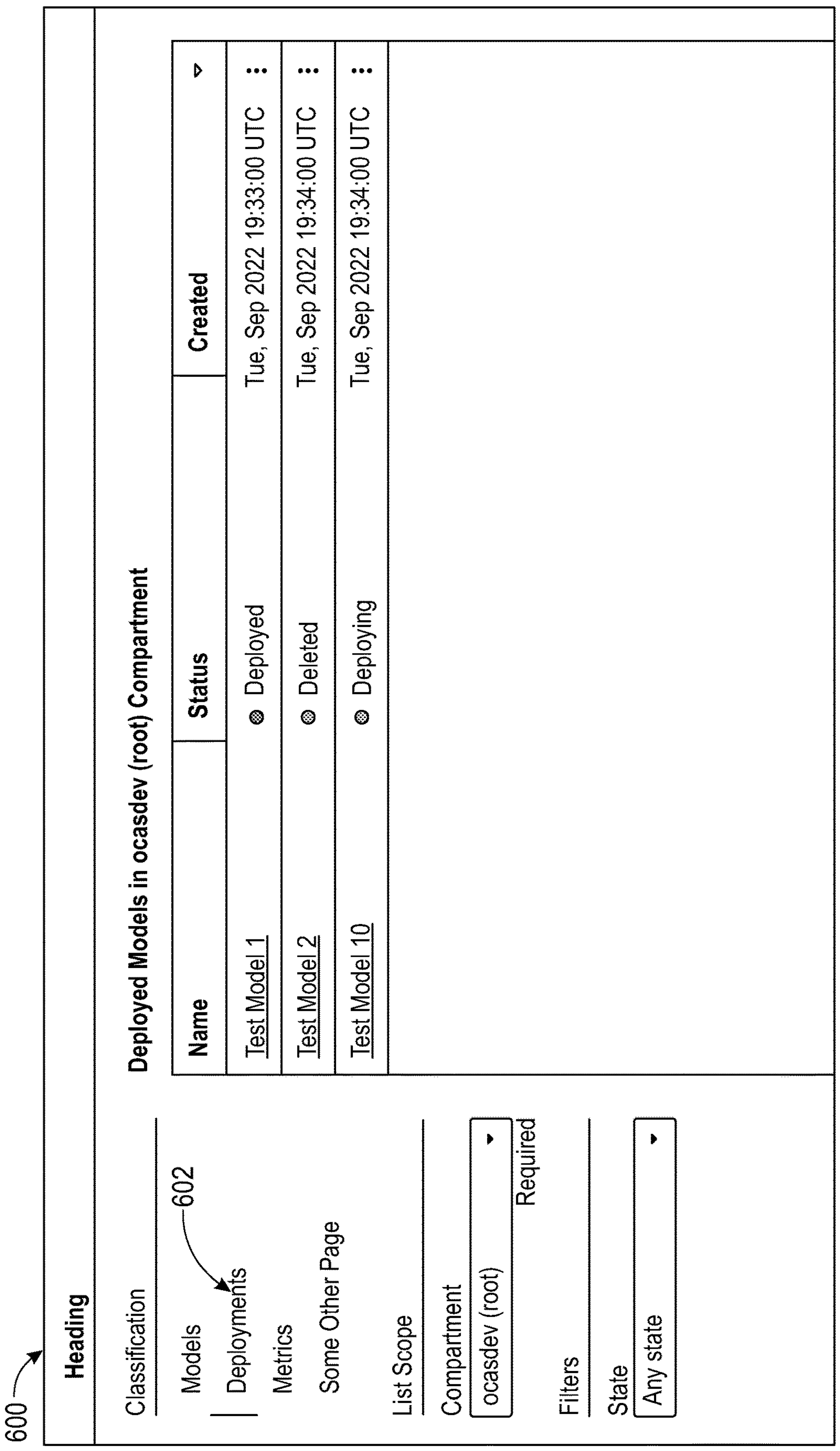
FIG. 6 is a screenshot of an example user interface provided by a management application, depicting a status of models, in an embodiment.

FIG. 6 is a screenshot of an example user interface 600 provided by a management application, depicting a status of models, in an embodiment. UI 600 is a result of a user selecting view option 504 in UI 500. UI 600 indicates that there are three models that have been deployed, are deployed, or will be deployed. The first two listed models in UI 600 are listed in UI 500. The third listed model in UI 600 would have been listed in UI 500 if the table in UI 500 had one more row.

In an embodiment, using the management application, a user may provide input that organizes two or more AI capabilities in a series or directed graph. For example, a user selects two AI capabilities: the first AI capability related to anomaly detection (AD) and the second AI capability related to forecasting. The user provides further input that indicates that output that is based on output (of an AD model that will be trained based on the first AI capability) is input to a forecasting model that will be trained based on the second AI capability. Thus, the AD model "cleans" input data by removing anomalies or outliers in the input data and the "cleaned' input data is then input to the forecasting model. In this way, two or more AI capabilities may be stitched together.

Example Process

Figure 7:
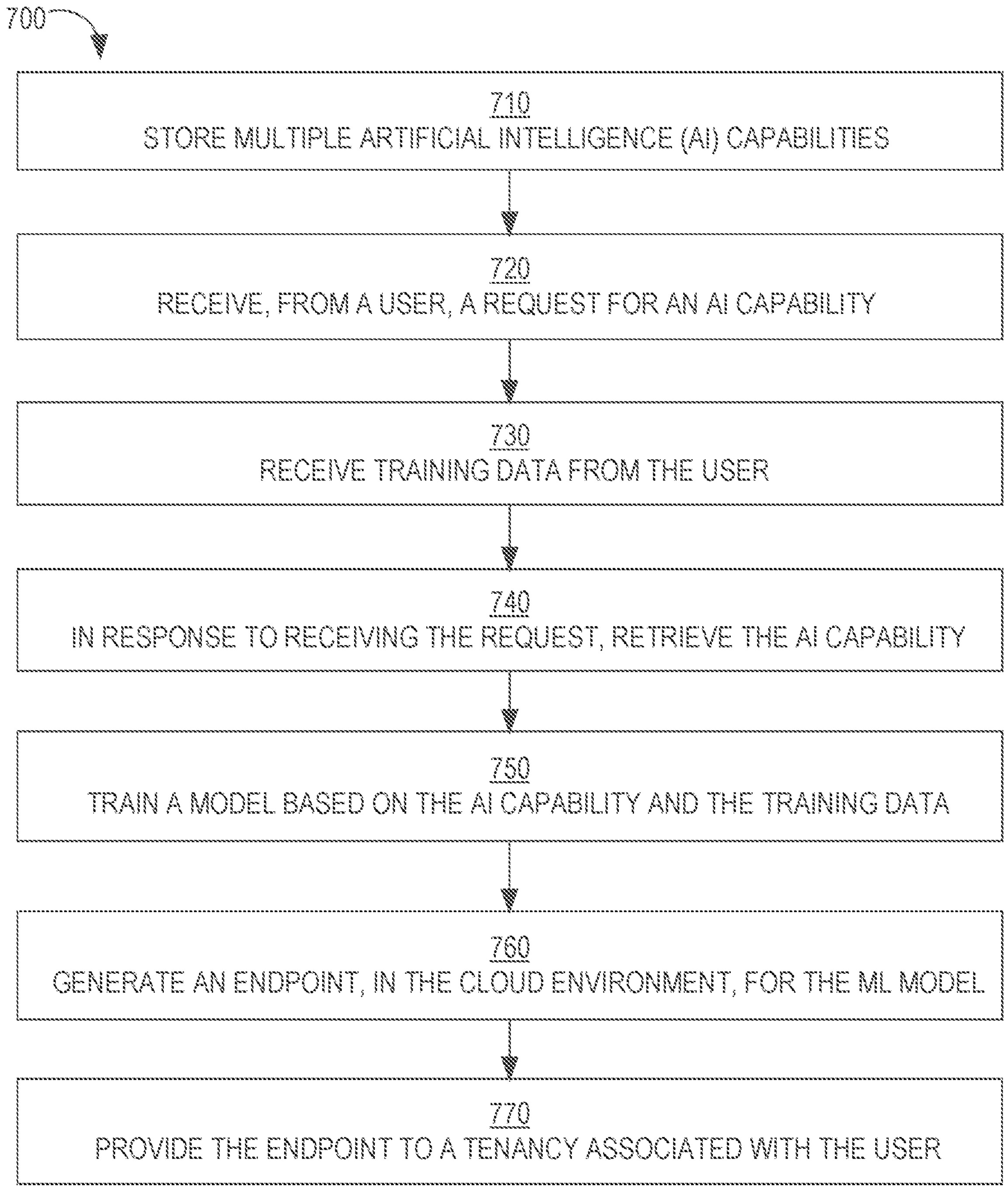
FIG. 7 is a flow diagram that depicts an example process 700 for processing AI capabilities, in an embodiment.

FIG. 7 is a flow diagram that depicts an example process 700 for processing AI capabilities, in an embodiment. Process 700 is performed by one or more components of cloud system 110.

At block 710, multiple AI capabilities are stored in a cloud environment. The AI capabilities may have been defined by a set of one or more administrators of cloud system 110 and are stored in a certain location that is accessible to multiple users of cloud system 110. The AI capabilities may be stored in AI capabilities storage 142.

At block 720, while storing the AI capabilities, a request for a particular AI capability is received. The request may have been received from a client device (e.g., client device 102) over a computer network, such as the Internet. Block 720 may involve a management application, executing on client device 102, presenting a listing of multiple AI capabilities from which to select. The management application may access AI capabilities storage 142 directly or indirectly through data science tenancy 130. The management application may present only those AI capabilities to which the requesting user has access, according to policies 144.

At block 730, training data is received from the user. Block 730 may involve receiving, from the user, input that specifies (e.g., in a user interface of the management application) a storage location of where the training data is stored and an instruction to upload the training data to the cloud environment when the training data is not already located in the cloud environment. Block 730 may further involve storing the received training data in a tenancy, associated with the user, in the cloud environment. An example of the user's tenancy is customer tenancy 120. Block 730 may have been performed before or after block 720.

At block 740, in response to receiving the request, the particular AI capability is accessed. The particular AI capability may be a pre-trained ML model or a framework for training a new ML model. If access authorization checking is not performed in block 720, then block 740 may involve checking one or more of policies 144 associated with the particular AI capability to determine whether the user is authorized to use or leverage the particular AI capability.

At block 750, a new ML model is trained based on the particular AI capability and the training data. Block 750 is performed without requiring any code or data from the user creating a training job. Instead, a training instance within data science tenancy 130 trains the new ML model on behalf of the user. Block 750 may also involve, prior to training the ML model, prompting the user for one or more inputs that are based on the requested AI capability. Different AI capabilities may be associated with different prompts/questions.

Block 750 may also involve generating status data or other statistics about the training, such as when training began, when validation began (if applicable), what the current stage of training is, one or more correctness metrics of one or more trained ML models, etc. Such data is made available to a tenancy of the user that initiated the training.

At block 760, an endpoint is generated in the cloud environment, where the endpoint is associated with the ML model. The endpoint is a network location where one or more users can leverage or invoke the ML model. The endpoint may be public or may be private to the user/customer that initiated generation of the ML model.

At block 770, the endpoint is provided to the tenancy associated with the user (e.g., customer tenancy 120). The user may incorporate the endpoint in a model pipeline that may comprise multiple ML models, some receiving, as input, output from another model in the pipeline.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
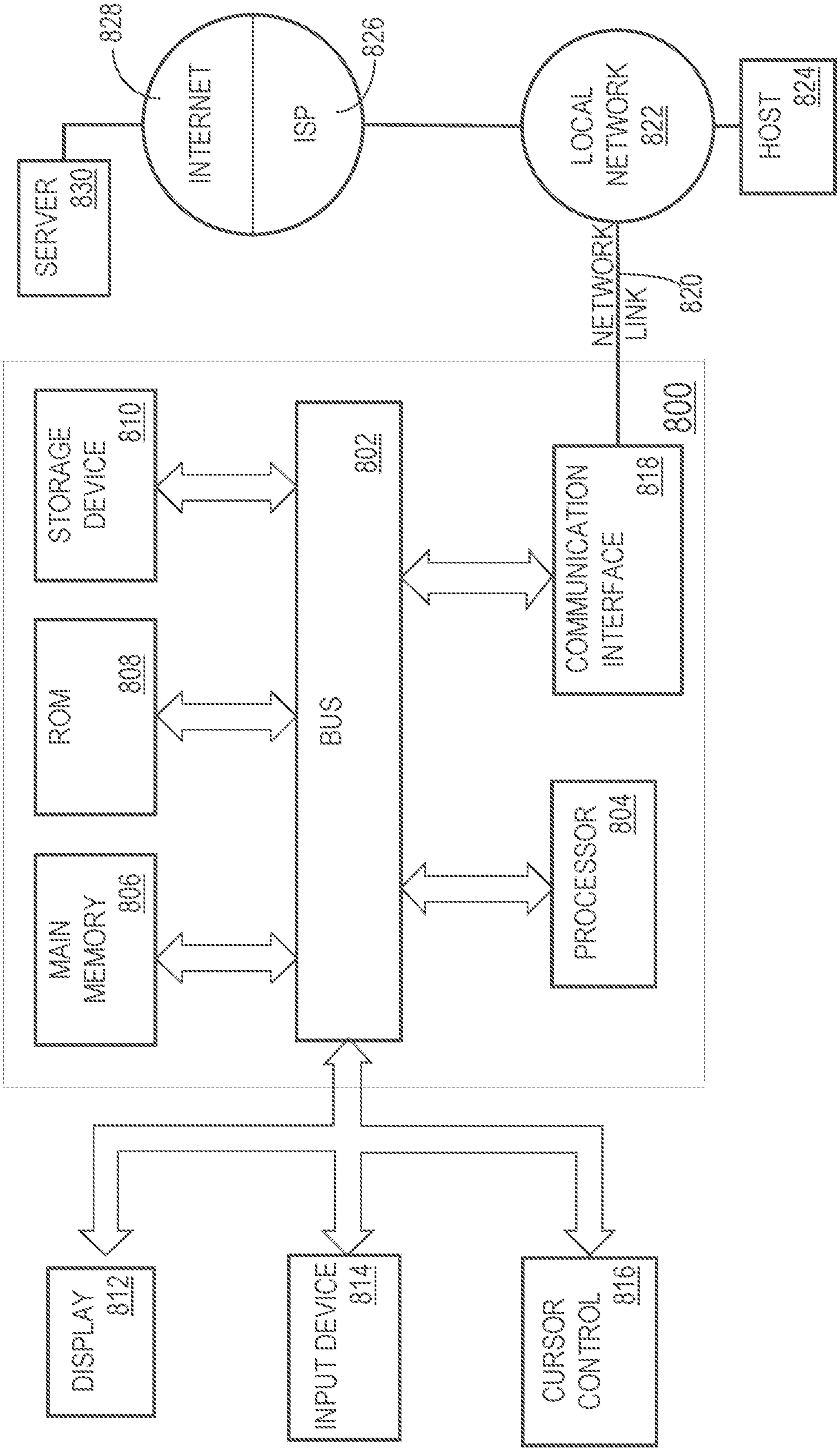
FIG. 8 is a block diagram that illustrates an example computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
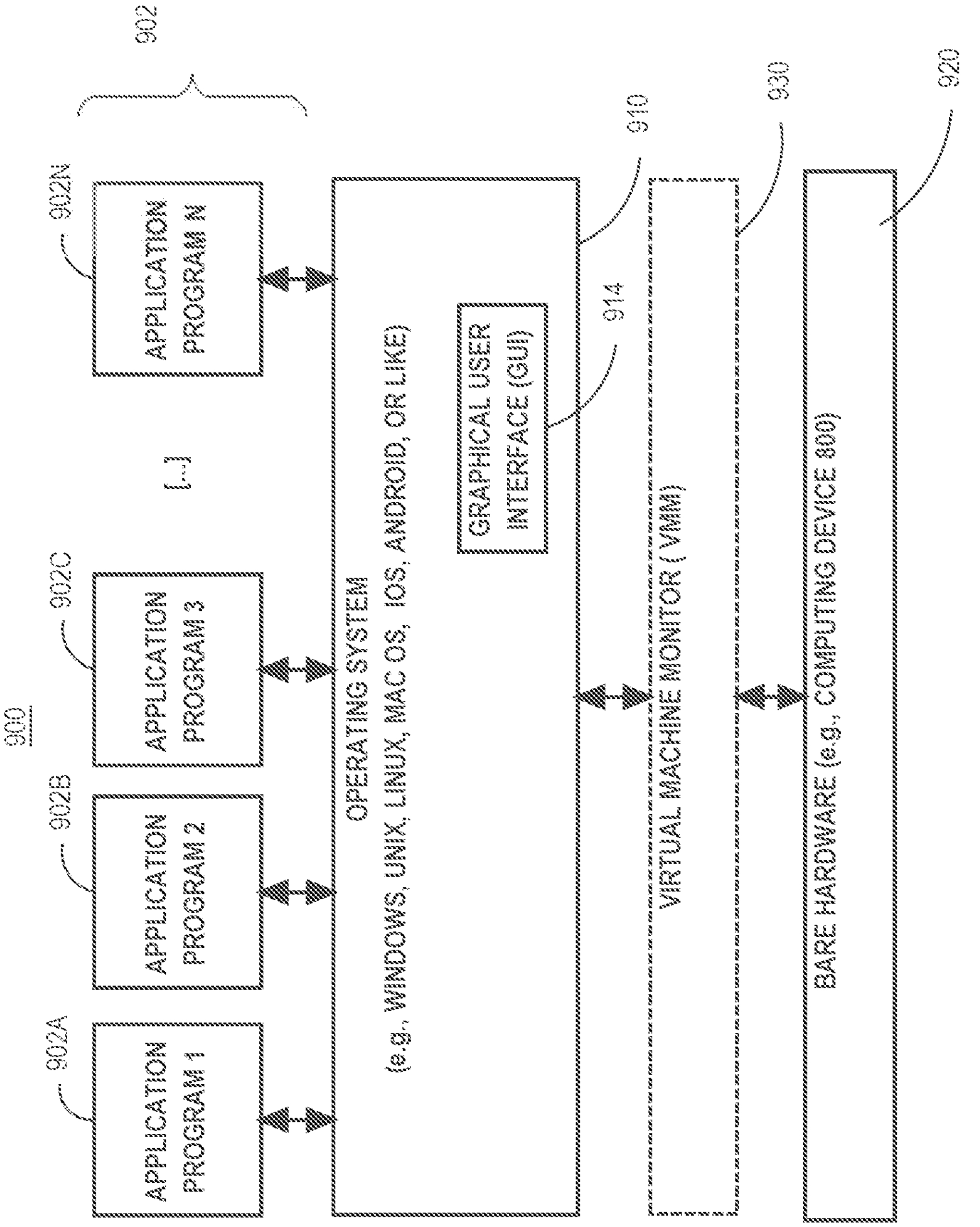
FIG. 9 is a block diagram of a basic software system that may be employed for controlling the operation of the example computer system.

FIG. 9 is a block diagram of a basic software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on computer system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of computer system 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the computer system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of computer system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

storing a plurality of artificial intelligence (AI) capabilities in a cloud environment;

while storing the plurality of AI capabilities:

receiving, from a computing device of a user, a request for a particular AI capability of the plurality of AI capabilities;

in response to receiving training data based on input from the user, storing the training data in a tenancy associated with the user in the cloud environment;

in response to receiving the request:

accessing the particular AI capability;

training a machine-learned (ML) model based on the particular AI capability and the training data to produce a trained ML model;

generating an endpoint, in the cloud environment, that is associated with the trained ML model;

providing the endpoint to the tenancy associated with the user;

generating statistics about usage of the plurality of AI capabilities by different users associated with different tenancies in the cloud environment;

where the statistics include one or more of, for each AI capability in the plurality of AI capabilities:

a number of tenancies with which said AI capability has been associated, a number of tenancies that have a particular ML model that is based on said AI capability where the particular ML model is currently deployed, a number of ML models that have been generated based on said AI capability, a number of ML models that have been generated based on said AI capability and are currently deployed, a number of ML models that have been generated based on said AI capability, that were deployed, but that are no longer deployed, or a number of trainings, of ML models that are based on said AI capability, that have failed;

wherein the method is performed by one or more computing devices.

2. The method of claim 1, wherein:

the particular AI capability comprises a pre-trained model;

training the ML model comprises fine-tuning the pre-trained model based on the training data.

3. The method of claim 1, wherein:

the particular AI capability comprises a framework for training the ML model;

training the ML model comprising leveraging the framework to train the ML model.

4. The method of claim 1, further comprising:

while training the ML model, generating a plurality of statistics associated with training the ML model;

wherein the plurality of statistics includes one or more of when training began, when validation began, or a current stage of the training;

storing the plurality of statistics in the tenancy associated with the user.

5. The method of claim 1, further comprising:

storing, in the tenancy associated with the user, a status of the training of the ML model and of the training of one or more other ML models that are associated with the tenancy;

wherein the status is one of a pre-training stage, training commenced, training in progress, training failed, or training complete.

6. The method of claim 1, further comprising:

storing a set of access policies that are associated with the plurality of AI capabilities;

wherein receiving the request is performed while storing the set of access policies;

in response to receiving the request, determining, based on the set of access policies, whether the user has access to the particular AI capability;

wherein retrieving the particular AI capability is only performed if it is determined, based on the set of access policies, that the user has access to the particular AI capability.

7. The method of claim 1, further comprising:

causing to be presented, on a screen of the computing device of the user, a list of multiple AI capabilities;

wherein receiving the request comprises receiving input that selects the particular AI capability from among the AI capabilities in the list.

8. The method of claim 1, further comprising:

receiving, from the computing device of the user, a view request to view a status of a plurality of ML models that are associated with the tenancy;

in response to receiving the view request, causing to be presented, on a screen of the computing device of the user, the status of each ML model in the plurality of ML models;

wherein the status is one of deployed, deleted, creating, or failed.

9. The method of claim 1, wherein the user is a first user and the tenancy is a first tenancy, further comprising:

receiving, from a second computing device of a second user that is different than the first user, a second request for the particular AI capability of the plurality of AI capabilities;

in response to receiving second training data based on second input from the second user, storing the second training data in a second tenancy that is different than the first tenancy and that is associated with the second user in the cloud environment;

in response to receiving the second request:

retrieving the particular AI capability;

training a second ML model based on the particular AI capability and the second training data;

generating a second endpoint, in the cloud environment, that is associated with the second ML model;

providing the second endpoint to the second tenancy associated with the second user.

10. One or more non-transitory storage media storing instructions which, when executed by one or more computing devices, cause:

storing a plurality of artificial intelligence (AI) capabilities in a cloud environment;

while storing the plurality of AI capabilities:

receiving, from a computing device of a user, a request for a particular AI capability of the plurality of AI capabilities;

in response to receiving training data based on input from the user, storing the training data in a tenancy associated with the user in the cloud environment;

in response to receiving the request:

accessing the particular AI capability;

training a machine-learned (ML) model based on the particular AI capability and the training data to produce a trained ML model;

generating an endpoint, in the cloud environment, that is associated with the trained ML model;

providing the endpoint to the tenancy associated with the user;

generating statistics about usage of the plurality of AI capabilities by different users associated with different tenancies in the cloud environment:

where the statistics include one or more of, for each AI capability in the plurality of AI capabilities:

a number of tenancies with which said AI capability has been associated, a number of tenancies that have a particular ML model that is based on said AI capability where the particular ML model is currently deployed, a number of ML models that have been generated based on said AI capability, a number of ML models that have been generated based on said AI capability and are currently deployed, a number of ML models that have been generated based on said AI capability, that were deployed, but that are no longer deployed, or a number of trainings, of ML models that are based on said AI capability, that have failed.

11. The one or more non-transitory storage media of claim 10, wherein:

the particular AI capability comprises a pre-trained model;

training the ML model comprises fine-tuning the pre-trained model based on the training data.

12. The one or more non-transitory storage media of claim 10, wherein:

the particular AI capability comprises a framework for training the ML model;

training the ML model comprising leveraging the framework to train the ML model.

13. The one or more non-transitory storage media of claim 10, wherein the instructions, when executed by the one or more processors, further cause:

while training the ML model, generating a plurality of statistics associated with training the ML model;

wherein the plurality of statistics includes one or more of when training began, when validation began, or a current stage of the training;

storing the plurality of statistics in the tenancy associated with the user.

14. The one or more non-transitory storage media of claim 10, wherein the instructions, when executed by the one or more processors, further cause:

storing, in the tenancy associated with the user, a status of the training of the ML model and of the training of one or more other ML models that are associated with the tenancy;

wherein the status is one of a pre-training stage, training commenced, training in progress, training failed, or training complete.

15. The one or more non-transitory storage media of claim 10, wherein the instructions, when executed by the one or more processors, further cause:

storing a set of access policies that are associated with the plurality of AI capabilities;

wherein receiving the request is performed while storing the set of access policies;

in response to receiving the request, determining, based on the set of access policies, whether the user has access to the particular AI capability;

wherein retrieving the particular AI capability is only performed if it is determined, based on the set of access policies, that the user has access to the particular AI capability.

16. The one or more non-transitory storage media of claim 10, wherein the instructions, when executed by the one or more processors, further cause:

causing to be presented, on a screen of the computing device of the user, a list of multiple AI capabilities;

wherein receiving the request comprises receiving input that selects the particular AI capability from among the AI capabilities in the list.

17. The one or more non-transitory storage media of claim 10, wherein the instructions, when executed by the one or more processors, further cause:

receiving, from the computing device of the user, a view request to view a status of a plurality of ML models that are associated with the tenancy;

in response to receiving the view request, causing to be presented, on a screen of the computing device of the user, the status of each ML model in the plurality of ML models;

wherein the status is one of deployed, deleted, creating, or failed.

18. The one or more non-transitory storage media of claim 10, wherein the user is a first user and the tenancy is a first tenancy, wherein the instructions, when executed by the one or more processors, further cause:

receiving, from a second computing device of a second user that is different than the first user, a second request for the particular AI capability of the plurality of AI capabilities;

in response to receiving second training data based on second input from the second user, storing the second training data in a second tenancy that is different than the first tenancy and that is associated with the second user in the cloud environment;

in response to receiving the second request:

retrieving the particular AI capability;

training a second ML model based on the particular AI capability and the second training data;

generating a second endpoint, in the cloud environment, that is associated with the second ML model;

providing the second endpoint to the second tenancy associated with the second user.

19. A system comprising:

one or more computing devices;

one or more non-transitory storage media storing instructions which, when executed by the one or more computing devices, cause:

storing a plurality of artificial intelligence (AI) capabilities in a cloud environment;

while storing the plurality of AI capabilities:

receiving, from a computing device of a user, a request for a particular AI capability of the plurality of AI capabilities;

in response to receiving training data based on input from the user, storing the training data in a tenancy associated with the user in the cloud environment;

in response to receiving the request:

accessing the particular AI capability;

training a machine-learned (ML) model based on the particular AI capability and the training data to produce a trained ML model;

generating an endpoint, in the cloud environment, that is associated with the trained ML model;

providing the endpoint to the tenancy associated with the user;

generating statistics about usage of the plurality of AI capabilities by different users associated with different tenancies in the cloud environment;

where the statistics include one or more of, for each AI capability in the plurality of AI capabilities:

a number of tenancies with which said AI capability has been associated, a number of tenancies that have a particular ML model that is based on said AI capability where the particular ML model is currently deployed, a number of ML models that have been generated based on said AI capability, a number of ML models that have been generated based on said AI capability and are currently deployed, a number of ML models that have been generated based on said AI capability, that were deployed, but that are no longer deployed, or a number of trainings, of ML models that are based on said AI capability, that have failed.

20. The system of claim 19, wherein:

the particular AI capability comprises a pre-trained model;

training the ML model comprises fine-tuning the pre-trained model based on the training data.

* * * * *